Figure 1:
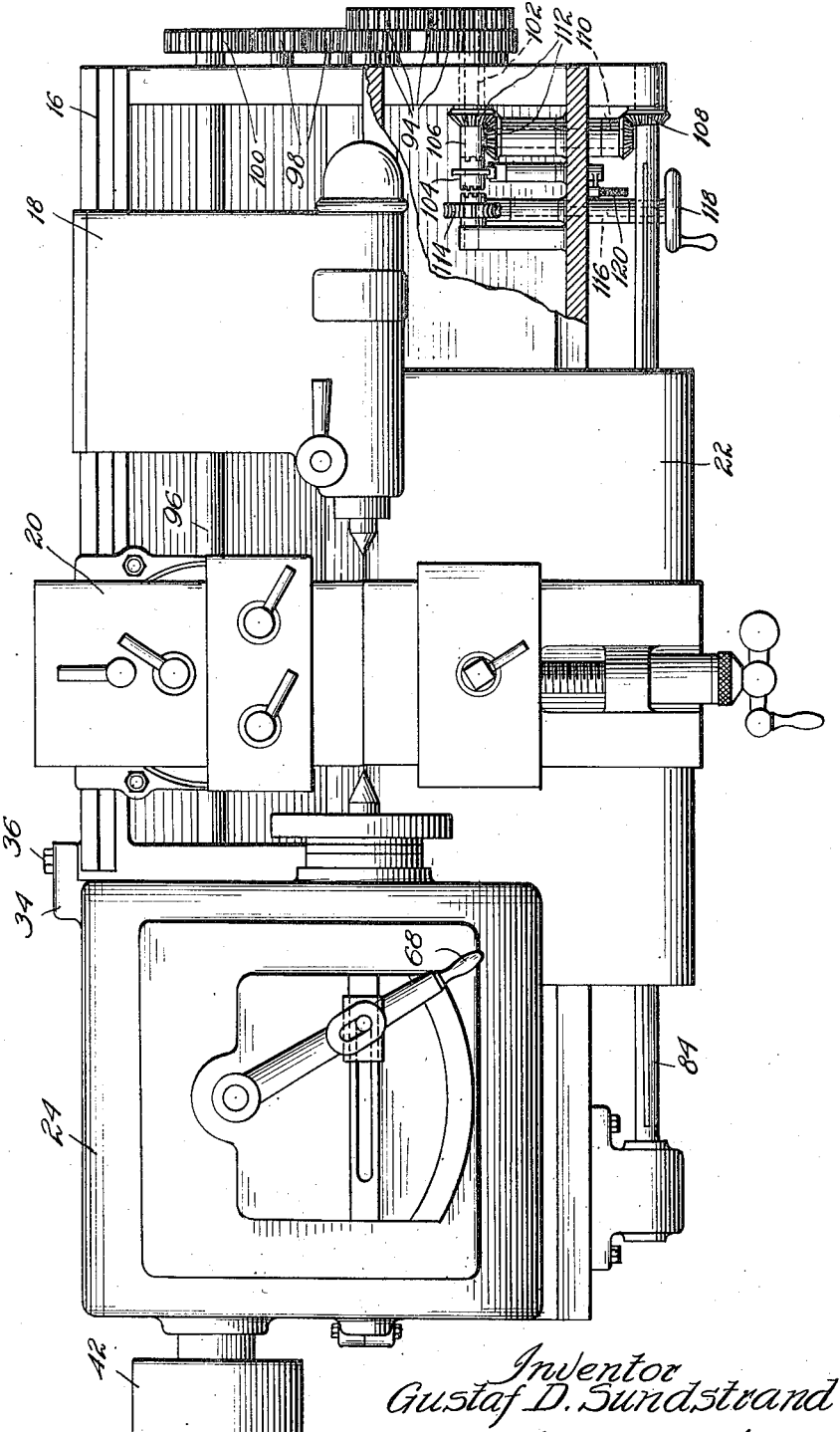

Oct. 7, 1924.

G. D. SUNDSTRAND

LATHE

Filed Feb. 2, 1921    3 Sheets-Sheet 1

1,510,567

Inventor
Gustaf D. Sundstrand
By Miller, Chindahl & Parker
Attys

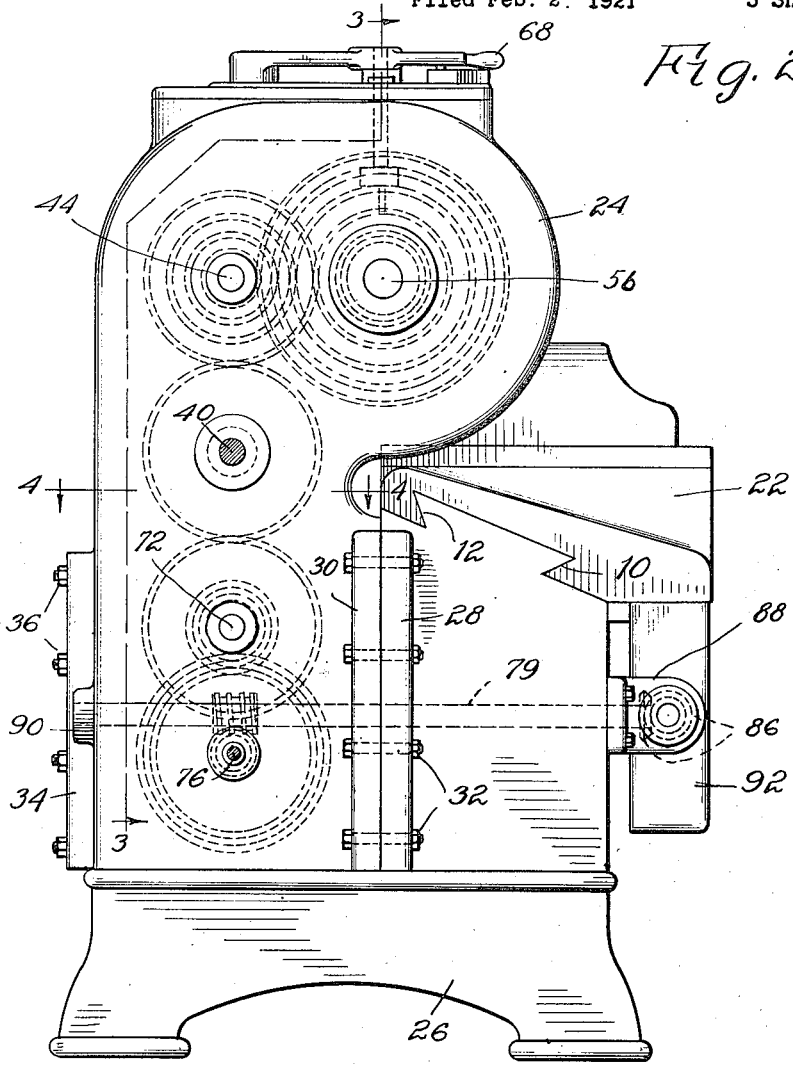

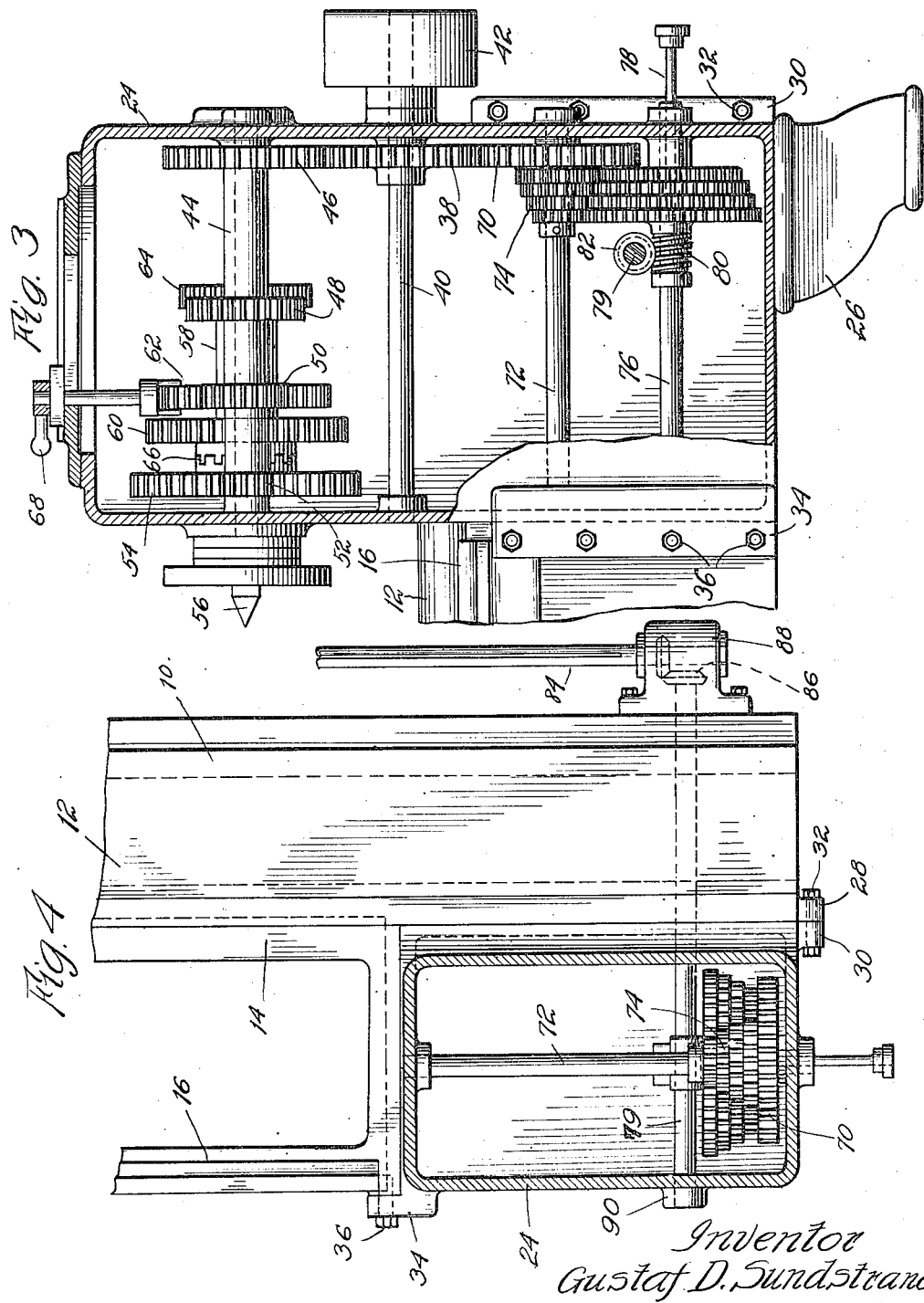

Patented Oct. 7, 1924.

1,510,567

UNITED STATES PATENT OFFICE.

GUSTAF DAVID SUNDSTRAND, OF ROCKFORD, ILLINOIS, ASSIGNOR TO ROCKFORD TOOL COMPANY, OF ROCKFORD, ILLINOIS, A CORPORATION OF ILLINOIS.

LATHE.

Application filed February 2, 1921. Serial No. 441,760.

*To all whom it may concern:*

Be it known that I, GUSTAF DAVID SUNDSTRAND, a citizen of the United States, residing at Rockford, in the county of Winnebago and State of Illinois, have invented certain new and useful Improvements in Lathes, of which the following is a specification.

My invention has reference to machine tools and more specifically to an improvement in lathes of the type designed to carry a rear tool carriage for performing an additional operation or operations on the work simultaneously with the machining of the same by the front tool.

One object of my invention is to increase the rigidity of the head stock and head stock mounting. I accomplish this in part by removing the head stock from the ways on which it has been heretofore customary to support it and forming it integral with or at least permanently and immovably attached to the lathe bed casting itself.

Another object is to arrange change speed gears for the feed of the tools inside the head stock casting. Among other advantages this practically eliminates the necessity of machining bearings in the lathe bed casting itself or using an additional casing bolted to the lathe bed to house the feed change gears. It also makes it relatively simple to run these gears in an oil bath for purposes of lubrication.

Further objects and advantages of my invention will become apparent as the description proceeds.

In the accompanying drawings Figure 1 is a plan view of a double-bed lathe according to my invention and Fig. 2 is an end view of the same. Fig. 3 is a section on line 3—3 of Fig. 2 and Fig. 4 is a section on line 4—4 of Fig. 2.

In the embodiment of my invention selected for illustration the lathe comprises the usual double bed having a front set of ways 10 and 12 and rear ways 14 and 16. The tail stock 18 and rear tool carriage 20 are mounted on the rear ways and may be of any suitable or preferred construction. The front ways support the front tool carriage 22 and extend past the head stock 24, the front tool carriage being made very long to provide a rigid support and protect the ways from chips and dirt, and the head stock end of the carriage sliding past the head stock to permit the tool to machine the work close up to the live center.

In the embodiment illustrated the head stock is not only bolted direct to the lathe bed casting, but the lathe bed casting is cut away at one corner and the head stock casting enters and fills the notch thus formed, extending down into abutment with the foot 26 which is preferably an integral part of the lathe bed casting. Lugs 28 and 30 extend from the adjacent edges of the lathe bed casting and head stock casting at the end of the lathe and are held firmly in abutting relation by means of bolts 32. Similarly a lug 34 projects from the diagonally opposite corner of the head stock casting beside the lathe bed and is bolted thereto by bolts 36 extending through the lug into the bed. It should be noted that both these sets of bolts extend at right angles to a vertical plane passing through the lathe centers so that the head stock casting is drawn by the bolts firmly against the lathe bed and by providing machined abutting surfaces on the two castings, accurate alinement of the parts may be obtained and preserved.

Any suitable set of change gears and transmission mechanism may be provided within the head stock for driving the spindle. I have illustrated a gear 38 on shaft 40 driven by means of pulley 42 from any suitable source of power. The gear 38 drives an intermediate shaft 44 carrying four gears 46, 48, 50 and 52. Gear 52 is continually in mesh with the large gear 54 loose on the spindle 56 and a sleeve 58 splined to the spindle 56 carries three other gears 60, 62 and 64, and has clutch teeth 66 for engagement with cooperating clutch teeth on the gear 54. In the position illustrated in Fig. 3 the drive is through gears 54 and 52 and the clutch and sleeve to the spindle 56. The sleeve may be slid back by means of control lever 68 to bring gear 60 in mesh with gear 50 for a second speed; gear 62 in mesh with gear 48 for a third speed; or gear 64 in mesh with gear 46 for a fourth speed.

The space inside the head stock casting below the spindle drive above described I prefer to utilize to house change speed gearing for the feed of the lathe tools. As illustrated, gear 38 meshes with gear 70 on shaft 72 which carries four gears forming a cone 74, each gear of which is continually in mesh with a cooperating gear loose on shaft 76. A slidable key in shaft 76 may be operated by control rod 78 projecting from the end of shaft 76 to key any one of the last mentioned gears to the shaft 76, whereby it may be driven at any one of four different speeds. It will be obvious that any one of a large number of well known speed changing devices may be substituted for cone 74 and the cooperating parts.

Transmission to the front tool carriage is by means of transverse shaft 79 driven from shaft 76 by means of a worm 80 and worm wheel 82, which transverse shaft drives a splined feed shaft 84 by means of bevels 86 housed in a casing 88. It will be evident that the portion of the head stock casting below shaft 76 may be made imperforate and filled with oil to provide an oil bath for lubricating the gears. It should also be noted that transverse shaft 79 has a bearing 90 in the rear wall of the head stock casting and another in the rear wall of the casing 88. If the casing 88 is an integral part of the lathe bed casting, this necessitates machining one bearing in the lathe bed casting, but I prefer to form the casing 88 as a separate piece bolted in place so that the head end of the lathe bed casting need have no bearings machined in it. The splined shaft 84 may actuate the front carriage by means of the usual or any preferred carriage feed mechanisms housed in the apron 92. As these devices form no part of my present invention, detailed description of the same is deemed unnecessary.

The rear tool carriage is preferably also arranged to be driven by power. I have illustrated a set of change gears 94 at the tail stock end of the bed, driving shaft 96 through intermediate gears 98 and gear 100. This transmission may be actuated by shaft 102 on which clutch collar 104 is splined. The clutch collar may be moved to mesh with clutch 106 driven from shaft 84 by means of bevels 108, shaft 110 and bevels 112, or it may be shifted into mesh with clutch teeth carried by a worm wheel 114 which may be actuated manually by means of a worm on shaft 116 which shaft carries the manual control wheel 118. A suitable control lever 120 is preferably provided for shifting the clutch collar 104.

While I have illustrated and described in detail the preferred embodiment of my invention, it should be clearly understood that the disclosure is merely for purposes of illustration and that many modifications and variations will naturally occur to those skilled in the art. I aim in the subjoined claims to cover all such legitimate variations and modifications.

I claim as my invention:

1. A lathe having, in combination, front ways and rear ways, said front ways extending throughout the length of the bed and said rear ways terminating short of the end of the bed at the head stock end, a head stock located beyond the end of said rear ways and directly and immovably attached to the bed, front and rear tool carriages mutually slidable past each other on said ways, one end of said front carriage being slidable on the front ways past the head stock, a tail stock on the rear ways offset to permit the front carriage to slide past it, a power transmission for feeding both carriages, said transmission extending first to the front carriage and past the same to the rear carriage, change speed mechanism housed in the head stock for driving the live spindle, and additional change speed mechanism also housed in the head stock for driving said power transmission.

2. A lathe having, in combination, two sets of ways of different lengths extending on opposite sides of the vertical plane of the center line of the lathe, a head stock fixedly attached to the bed at one end of the shorter set of ways, the longer set of ways extending past said head stock, a tail stock and a rear tool carriage on the shorter set of ways, and a front tool carriage having a long bearing on said longer ways and slidable past said head stock, rear tool and tail stock.

3. A lathe having, in combination, two sets of ways of different lengths extending on opposite sides of the vertical plane of the center line of the lathe, a head stock fixedly attached to the bed at one end of the shorter set of ways, a rear tool carriage on the shorter set of ways, and a front tool carriage on said longer set of ways and slidable past said head stock and rear tool, change speed mechanism housed in the head stock, a power transmission from said change speed mechanism, and connections for independently operating said front tool carriage and said rear tool carriage from different portions of said transmission.

4. A lathe having, in combination, front ways and rear ways, said front ways extending throughout the length of the bed and said rear ways terminating short of the end of the bed at the head stock end, a head stock located beyond the end of said rear ways and directly and immovably attached to the bed, and front and rear tool carriages mutually slidable past each other on said ways, one end of said front carriage being slidable on the front ways past the head stock.

5. A lathe having, in combination, two sets of ways of different lengths extending on opposite sides of the vertical plane of the center line of the lathe, a head stock fixedly attached to the bed at one end of the shorter set of ways, the longer set of ways extending past said head stock, and a tool carriage on said longer set of ways and slidable past said head stock.

6. A lathe having, in combination, a bed, a head stock immovably and permanently united with said bed to form a rigid integral structure, a set of feed change gears inside said head stock, and an operative connection between said feed change gears and the lathe carriage.

7. A lathe having, in combination, two sets of ways of different lengths extending on opposite sides of the vertical plane of the center line of the lathe, a head stock fixedly attached to the bed at one end of the shorter set of ways, a rear tool carriage on the shorter set of ways, and a front tool carriage on said longer set of ways and slidable past said head stock and rear tool, change speed mechanism, a power transmission from said change speed mechanism, and connections for independently operating said front tool carriage and said rear tool carriage from different portions of said transmission.

8. A lathe having, in combination, front ways and rear ways, said front ways extending throughout the length of the bed and said rear ways terminating short of the end of the bed at the head stock end, a head stock located beyond the end of said rear ways and directly and immovably attached to the bed, front and rear tool carriages mutually slidable past each other on said ways, one end of said front carriage being slidable on the front ways past the head stock, a power transmission for feeding both carriages, change speed mechanism housed in the head stock for driving the live spindle, and additional change speed mechanism also housed in the head stock for driving said power transmission.

9. A lathe having, in combination, two sets of ways of different lengths extending on opposite sides of the vertical plane of the center line of the lathe, and a head stock fixedly attached to the bed at one end of the shorter set of ways, the longer set of ways extending past said head stock.

10. A lathe having, in combination, two sets of ways of different lengths extending on opposite sides of the vertical plane of the center line of the lathe, a head stock fixedly attached to the bed at one end of the shorter set of ways, the longer set of ways extending past said head stock, a rear tool carriage on the shorter set of ways, and a front tool carriage having a long bearing on said longer set of ways and slidable past said head stock and rear tool, change speed mechanism housed in said head stock for driving the live spindle, additional change speed mechanism also housed in the head stock, a power transmission from said additional change speed mechanism, and connections for independently operating said front tool carriage and said rear tool carriage from different portions of said transmission.

11. A lathe having, in combination, front ways and rear ways, said front ways extending throughout the length of the bed and said rear ways terminating short of the end of the bed at the head stock end, a head stock located beyond the end of said rear ways and directly and immovably attached to the bed, front and rear tool carriages mutually slidable past each other on said ways, one end of said front carriage being slidable on the front ways past the head stock, a power transmission for feeding the front carriage, and change speed mechanism housed in the head stock for driving said power transmission.

12. A lathe having, in combination, two sets of ways of different lengths extending on opposite sides of the vertical plane of the center line of the lathe, and a head stock fixedly attached to the bed at one end of the shorter set of ways.

13. A lathe having, in combination, two sets of ways of different lengths extending on opposite sides of the vertical plane of the center line of the lathe, a head stock fixedly attached to the bed at one end of the shorter set of ways, the longer set of ways extending past said head stock, a tail stock and a rear tool carriage on the shorter set of ways, and a front tool carriage having a long bearing on said longer set of ways and slidable past said head stock, rear tool and tail stock, change speed mechanism housed in said head stock for driving the live spindle, additional change speed mechanism also housed in the head stock, a power transmission from said additional change speed mechanism, and connections for independently operating said front tool carriage and said rear tool carriage from different portions of said transmission.

14. A lathe having, in combination, front ways and rear ways, said front ways extending throughout the length of the bed and said rear ways terminating short of the end of the bed at the head stock end, and a head stock located beyond the end of said rear ways and directly and immovably attached to the bed.

15. A lathe having, in combination, a bed, a headstock immovably and permanently united with the bed to form a rigid integral structure, a tailstock movable relative to the headstock, a rear tool carriage mounted on the bed between the headstock and the tailstock, a front tool carriage, and a pair of ways located forwardly of the bed and extending past the headstock so as to support the front tool carriage for longitudinal movement on the bed.

In testimony whereof, I have hereunto set my hand.

GUSTAF DAVID SUNDSTRAND.